(12) United States Patent
McIlwain et al.

(10) Patent No.: US 8,051,634 B2
(45) Date of Patent: Nov. 8, 2011

(54) REPLACEABLE GUIDE ASSEMBLY TINES FOR AN AGRICULTURAL HARVESTER

(75) Inventors: Irwin D. McIlwain, Lancaster, PA (US); Derek S. Rude, Saskatchewan (CA); Robert Cropper, Saskatchewan (CA); Leslie G. Hill, Saskatchewan (CA)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/689,691

(22) Filed: Jan. 19, 2010

(65) Prior Publication Data

US 2011/0173944 A1   Jul. 21, 2011

(51) Int. Cl.
*A01D 43/00* (2006.01)
(52) U.S. Cl. .................................................. 56/190
(58) Field of Classification Search ............. 56/190, 56/227, 220, 364
See application file for complete search history.

(56) References Cited

U.S. PATENT DOCUMENTS

| | | | |
|---|---|---|---|
| 2,468,376 A | 4/1949 | Peeples | |
| 2,514,560 A * | 7/1950 | Scranton | 56/400 |
| 2,603,936 A | 7/1952 | Keene | |
| 2,691,266 A | 10/1954 | Meyer et al. | |
| 2,872,772 A * | 2/1959 | Nolt | 56/364 |
| 3,236,038 A | 2/1966 | Gates et al. | |
| 3,924,391 A | 12/1975 | Cheatum | |
| 4,300,337 A | 11/1981 | Sharp | |
| 4,304,090 A | 12/1981 | Gavrilenko et al. | |
| 4,411,127 A | 10/1983 | Diederich, Jr. et al. | |
| 4,463,546 A * | 8/1984 | Day | 56/364 |
| 4,516,389 A * | 5/1985 | Core | 56/341 |
| 6,244,027 B1* | 6/2001 | McClure et al. | 56/364 |
| 6,295,797 B1* | 10/2001 | Naaktgeboren et al. | 56/364 |
| 6,651,418 B1* | 11/2003 | McClure et al. | 56/341 |
| 6,688,092 B2* | 2/2004 | Anstey et al. | 56/220 |
| 6,810,650 B2 | 11/2004 | McClure | |
| 6,877,304 B1* | 4/2005 | Smith et al. | 56/364 |
| 6,935,094 B1* | 8/2005 | McClure | 56/190 |
| 7,107,748 B2* | 9/2006 | McClure | 56/190 |
| 7,650,741 B2* | 1/2010 | Graber et al. | 56/364 |
| 7,654,069 B1* | 2/2010 | Dunham et al. | 56/190 |
| 7,823,371 B2* | 11/2010 | Gantzer et al. | 56/190 |
| 2006/0277888 A1* | 12/2006 | Erdmann et al. | 56/344 |
| 2006/0277889 A1 | 12/2006 | Sheedy et al. | |
| 2008/0264028 A1* | 10/2008 | Woodford | 56/16.4 R |

FOREIGN PATENT DOCUMENTS

GB           211618 A           7/1981

\* cited by examiner

*Primary Examiner* — Arpad Fabian-Kovacs
(74) *Attorney, Agent, or Firm* — Michael G. Harms

(57) ABSTRACT

An agricultural harvester is provided that Includes a frame carrying a structure movable about an endless path to deliver a crop to a header. The frame includes a guide assembly including a guide member supported by the frame. The frame also includes at least one tine secured to the guide member without extending through the guide member, and the at least one tine extending from the guide member above the structure to guide the crop between the at least one tine and the structure to the header. The at least one tine is installable and removable from the guide member without disconnecting the guide member from the frame. At least one tine is installable and removable from the guide member substantially without tools.

17 Claims, 11 Drawing Sheets

REPLACEABLE GUIDE ASSEMBLY TINES FOR AN AGRICULTURAL HARVESTER

FIELD OF THE INVENTION

The present invention relates to the improvement of an agricultural harvester. More specifically it relates to an improvement for the attachment and removal of windguard or guide assembly tines on a windguard guide assembly.

BACKGROUND OF THE INVENTION

Crop gathering devices for collecting crops arranged in windrows can include a belt positioned along the front of the device. The belt is driven to rotate between opposed pairs of roller assemblies to convey the crops into a header that is secured to an agricultural harvester, such as a combine which is directed along the windrow. One or more wheels is located near the belt opposite the header to maintain a spacing between the belt and the ground that most effectively conveys crops onto the belt.

Positioned above the crop gathering device, also referred to as a windrow pickup, is a guide assembly, also referred to as a windguard assembly. The guide assembly tines ensure that the crop material is properly conveyed into the header in spite of any wind or varying crop conditions. Typically, the guide assembly consists of a pipe and a series of tines held in position above and in front of the pickup. Affixed to the pipe are a series of tines. The pipe may be raised or lowered by activating hydraulic cylinders on each end by the operator from the combine cab. Tine angular adjustment may also be performed manually at the end of the pipe. These tines frequently break off or are damaged during the life of the crop gathering device. The guide or windguard tines are typically wrapped, welded or bolted onto the pipe making replacement difficult. The prior art shows a variety of means to attach the windguard tines to the pipe, however these methods have not been entirely successful.

What is needed are replaceable guide assembly tines that can be easily removed for servicing or replacement with a minimum or complete absence of tools.

SUMMARY OF THE INVENTION

The present invention relates to an agricultural harvester including a frame carrying a structure movable about an endless path to deliver a crop to a header. The frame includes a guide assembly further including a guide member supported by the frame. The frame includes at least one tine secured to the guide member without extending through the guide member, and the at least one tine extending from the guide member above the structure to guide the crop between the at least one tine and the structure to the header. The at least one tine is installable and removable from the guide member without disconnecting the guide member from the frame. The at least one tine is installable and removable from the guide member without tools.

The present invention further relates to a guide assembly for use with an agricultural harvester having a frame carrying a structure movable about an endless path to deliver a crop to a header. The guide assembly includes a guide member supportable by the frame. At least one tine is securable over an exterior surface of the guide member without extending through the guide member, and is configured to extend from the guide member above the structure to guide the crop between the at least one tine and the structure to the header. The at least one tine is removable from the guide member without disconnecting the guide member from the frame. The at least one tine is removable from the guide member substantially without tools.

The present invention yet further relates to an agricultural harvester including a frame carrying a structure movable about an endless path to deliver a crop to a header. The frame includes a guide assembly further including a guide member supported by the frame. The frame also includes at least one tine secured over an exterior surface of the guide member without extending through the guide member, and extending from the guide member above the structure to guide the crop between the at least one tine and the structure to the header. The at least one tine is installable and removable from the guide member without disconnecting the guide member from the frame. The at least one tine is installable and removable from the guide member substantially without tools.

An advantage of the present invention is the installation/replacement of a guide or windrow tine with minimal or no tools.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
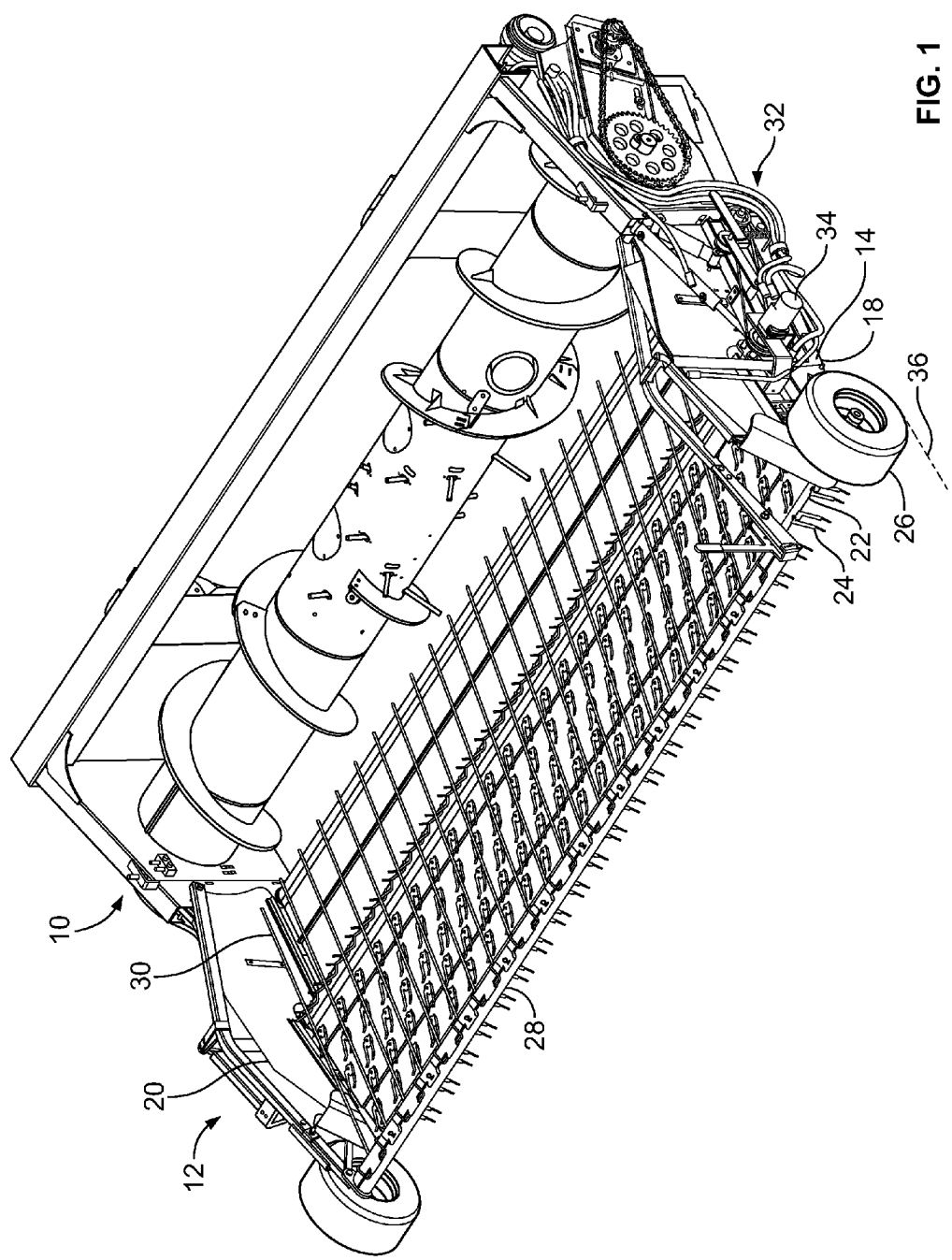
FIG. 1 is a top perspective view of an embodiment of a crop gathering device and harvesting header of the present invention.

FIG. 1 shows a crop gathering device 12 for use with a harvesting header 10. Harvesting header 10 may be secured to an agricultural harvester such as a combine (not shown) as is known in the art and not further discussed. A frame 14 carries a structure 22 movable about an endless path to deliver a crop to harvesting header 10. In one embodiment, structure 22 is a belt, or multiple belts, that extends from one end 18 of frame 14 toward another end 20 of frame 14. Structure 22 may be driven about a set of parallel rollers (not shown) by a power source such as a hydraulic motor 34. Structure 22 may include a plurality of prongs 24 or fork-like components extending outwardly from the structure to assist with collecting crops arranged in a windrow. Wheels 26 may be rotatably secured to or near respective ends 18, 20 of frame 14 opposite header 10 to maintain one end of structure 22 near the ground 36 to permit prongs 24 of structure 22 to gather or collect crops arranged in the windrow. A guide member 28 equipped with tines 30, collectively defining a guide assembly 32, may be positioned over structure 22 to more effectively feed or deliver crops from structure 22 to header 10 especially during windy conditions.

Figure 2:
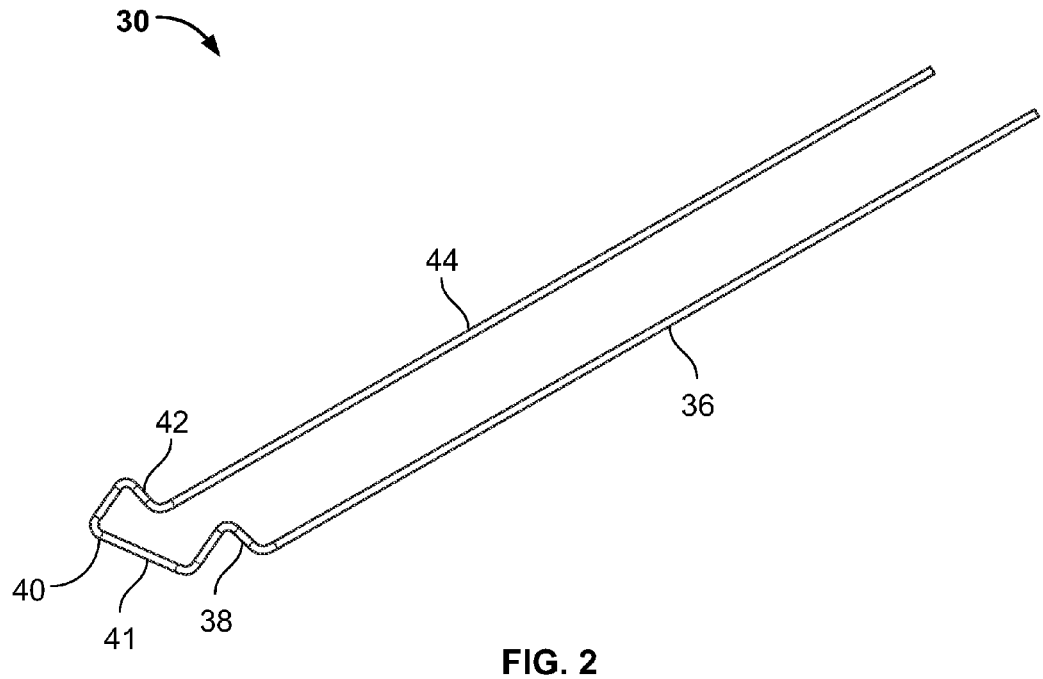
FIG. 2 is a top perspective view of an embodiment of a guide or windguard tine construction of the crop gathering device of FIG. 1 of the present invention.

Referring to FIG. 2, an exemplary embodiment of tine 30 includes an elongated first leg 36 extending to a first transition portion 38 and then further extending to a second transition portion 40. As further shown in FIG. 2, second transition portion 40 bridges first transition portion 38 with a third transition portion 42. Tine 30 then further extends from third transition portion 42 to any elongated second leg 44. Shown in FIG. 2, dividing the embodiment of tine 30 into two pieces along a midpoint 41 of second transition portion 40 provides two mirror-image components. That is, legs 36 and 44 may be identical and/or symmetric with each other, while first transition portion 38 continuously extending to one half of second transition portion 40 may symmetrically correspond to the other one half of second transition portion 40 contiguously extending to third transition portion 42. In one embodiment, tine 30 is composed of metal, although nonmetal materials may be used, such as fiberglass, polymerics or other suitable materials.

Figure 3:
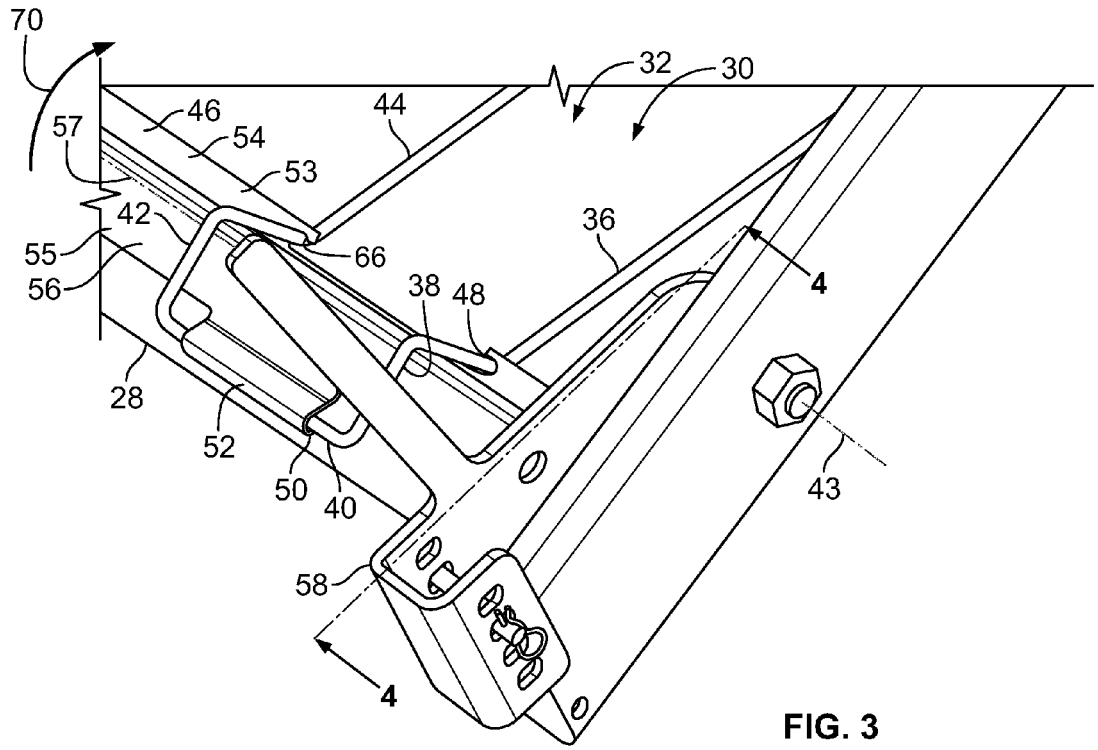
FIG. 3 is an enlarged, partial perspective view of the guide or windguard tine construction of FIG. 1 assembled to the frame of the crop gathering device of the present invention.
Figure 4:
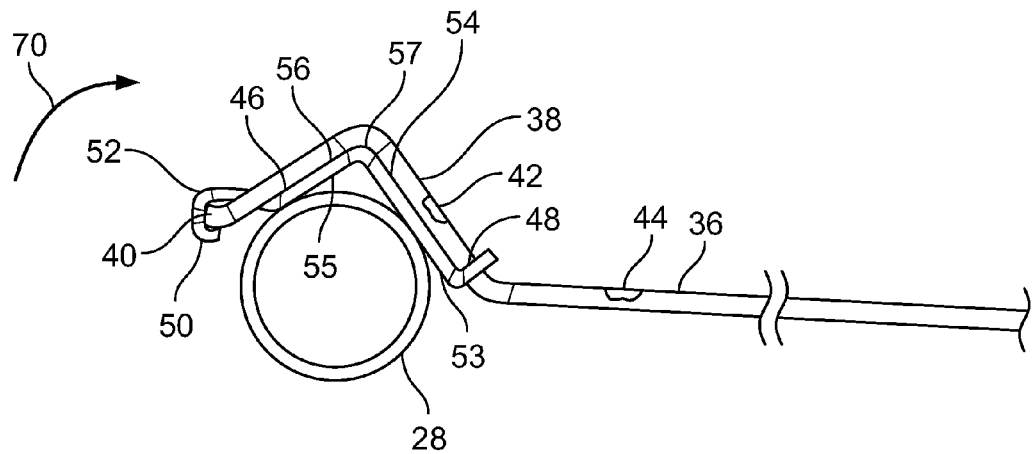
FIG. 4 is a cross section taken along line 4-4 of FIG. 3 of the guide or windguard tine construction of FIG. 1 assembled to the frame of the crop gathering device of the present invention.
Figure 5:
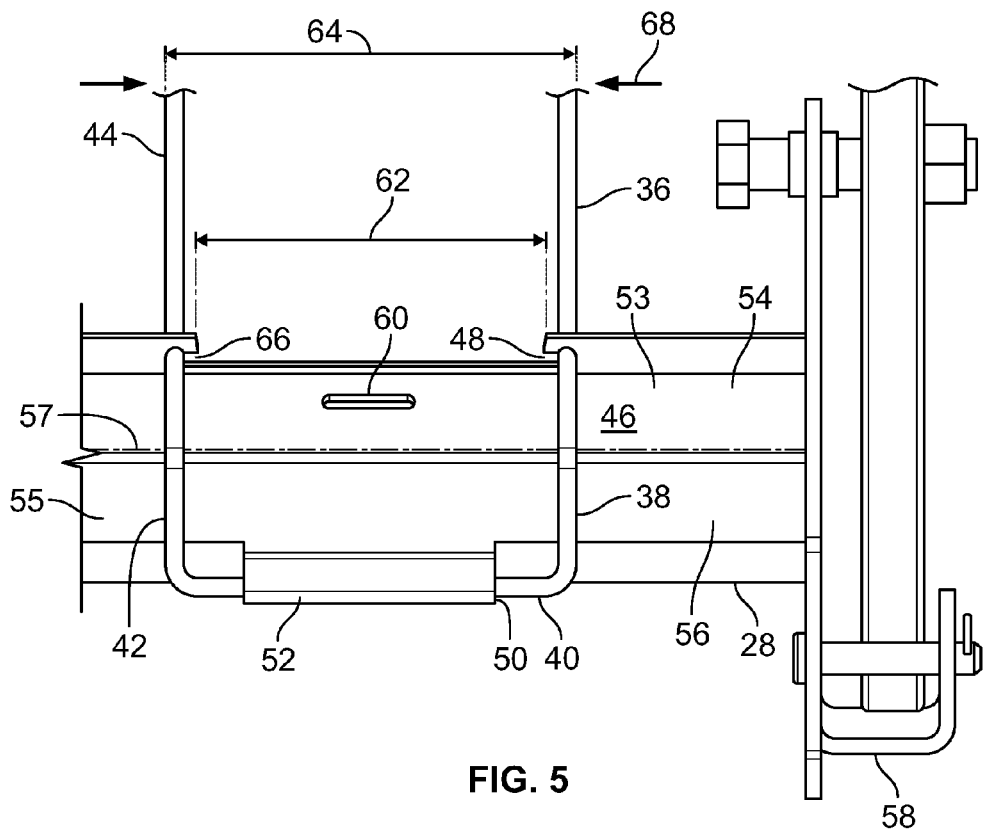
FIG. 5 is an enlarged, partial plan view of the guide or windguard tine construction of FIG. 1 assembled to the frame of the crop gathering device of the present invention.

Referring to FIGS. 3-5, the exemplary embodiment of tine 30 is assembled to guide member 28, forming guide assembly 32. In one embodiment, an angular adjustment mechanism 58 may be positioned at opposed ends of guide assembly 32, permitting angular adjustment of guides assembly 32 with respect to structure 22 (FIG. 1) to accommodate operating conditions, such as the amount of wind and the relative size of the crop being harvested. That is, by pivoting angular adjustment mechanism 58 about an axis 43, the angular orientation and relative distance between legs 36 and 44 and structure 22 may be selectively varied. An alternate version could use only one adjustment mechanism on one end of the guide assembly.

Further referring to FIGS. 3-5, tine 30 is secured to guide member 28. In one embodiment, guide member 28, shown having a circular cross section (FIG. 4) includes an overlay member 46 that may be welded, adhered, mechanically fastened or otherwise secured to guide member 28. In one embodiment, overlay member 46 extends over a substantial portion of the length of guide member 28, although in other embodiments, numerous overlay members 46 may be aligned and secured to guide member 28. As shown, overlay member 46 defines an angle member having legs 53, 55 secured to guide member 28 so that corner 57 of overlay member 46 joining legs 53, 55 extends outwardly from guide member 28. Overlay member 46 includes a tab 52 extending from an end of legs 55 opposite corner 57, defining a second mating feature 50 corresponding with second transition portion 40 of tine 30 when brought into engagement with each other. In an alternate embodiment, tab 52 may be formed from a flap formed in guide member 28 so that the flap is of unitary construction with guide member 28.

Once second transition portion 40 and second mating feature 50 have been brought and assembled together, tine 30 may be rotated about the axis defined by second mating feature 50 in a rotational direction 70 (FIG. 3) until the junction between third transition portion 42 and second leg 44 is brought into proximity with third mating feature 66, and similarly the junction between first transition portion 38 and first leg 36 is brought into proximity with first mating feature 48. As shown, first mating feature 48 and third mating feature 66 define slots formed in an end of leg 53 of overlay member 46 opposite corner 57. Since a distance 64, which separates legs 36 and 44 is greater than a distance 62 between first mating feature 48 and third mating feature 66, legs 36 and 44 may not be brought into mating engagement with their respective mating features 48, 66. However, by application of sufficient opposed forces 68 applied to legs 36, 44, distance 64 between legs 36 and 44 is reduced until distance 64 is less than distance 62, permitting legs 36, 44 to be brought into proximity with respective mating features 48, 66 by further rotation of tines 30 about the axis defined by second mating feature 50 in rotational direction 70. That is, as shown in FIG. 4, tines 30 are rotated about the axis defined by second mating feature 50 until third transition portion 42 and first transition portion 38 are each brought into abutting contact with surfaces 54, 56 of respective legs 53, 55 of overlay member 46. However, in an alternate embodiment, surfaces 54, 56 of respective legs 53, 55 of overlay member are not brought into abutting contact with each other in response to legs 36, 44 being brought into proximity with respective mating features 48, 66. Once opposed forces 68 are no longer applied to legs 36 and 44, elastic restorative retention forces applied by tines 30 increase the distance between legs 36 and 44 and permitting mating engagement with respective mating features 48, 66.

It is to be understood that although mating features 48, 66 may be parallel with the axis defined by second mating feature 50, as in the exemplary embodiment, such alignment is not required. That is, a combination of opposed forces such as opposed forces 68 in addition with twisting court portion will forces (not shown) may be required to achieve mating engagement between the corresponding portions of tines 30 and guide member 28, which includes overlay member 46.

It is to be understood that in other embodiments, different profiles of overlay member and corresponding transition portions of times may be used. Optionally, mating features may be formed directly in guide member without use of an overlay member. In a further embodiment, a portion of the mating features may be formed directly in the guide member with the remaining portion of mating features formed in the overlay member.

Figure 6:
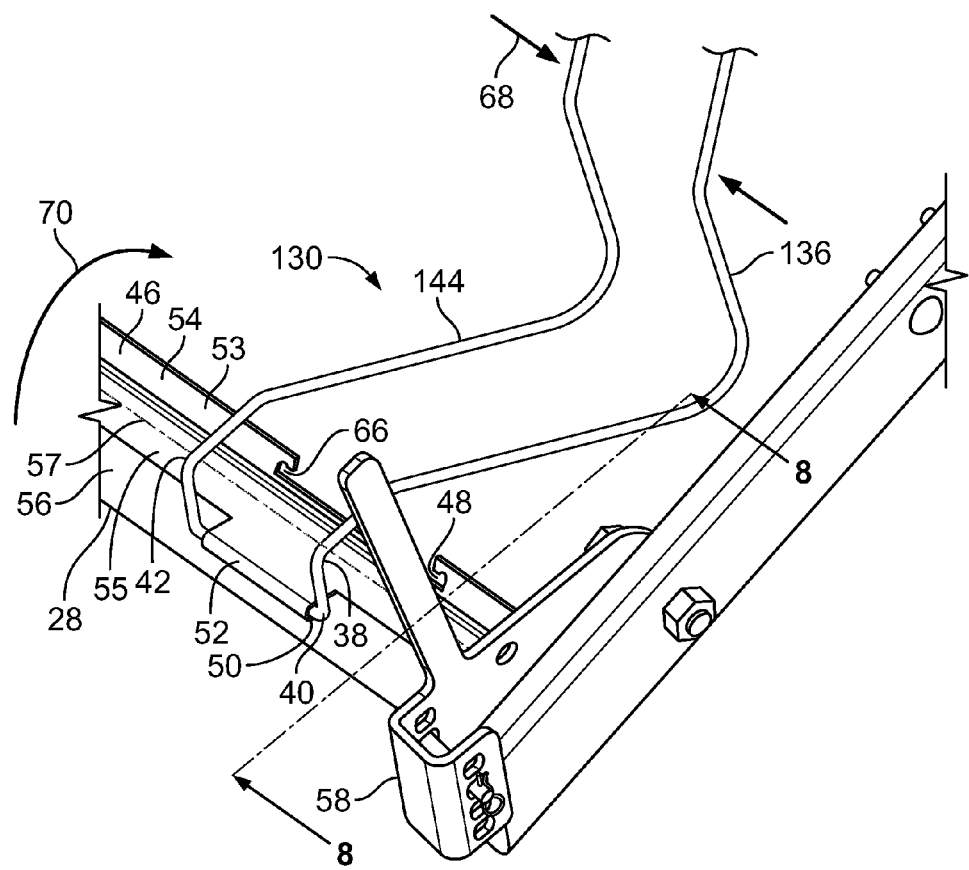
FIG. 6 is an enlarged, partial perspective view of an alternate guide or windguard tine construction partially assembled to the frame of the crop gathering device of the present invention.
Figure 7:
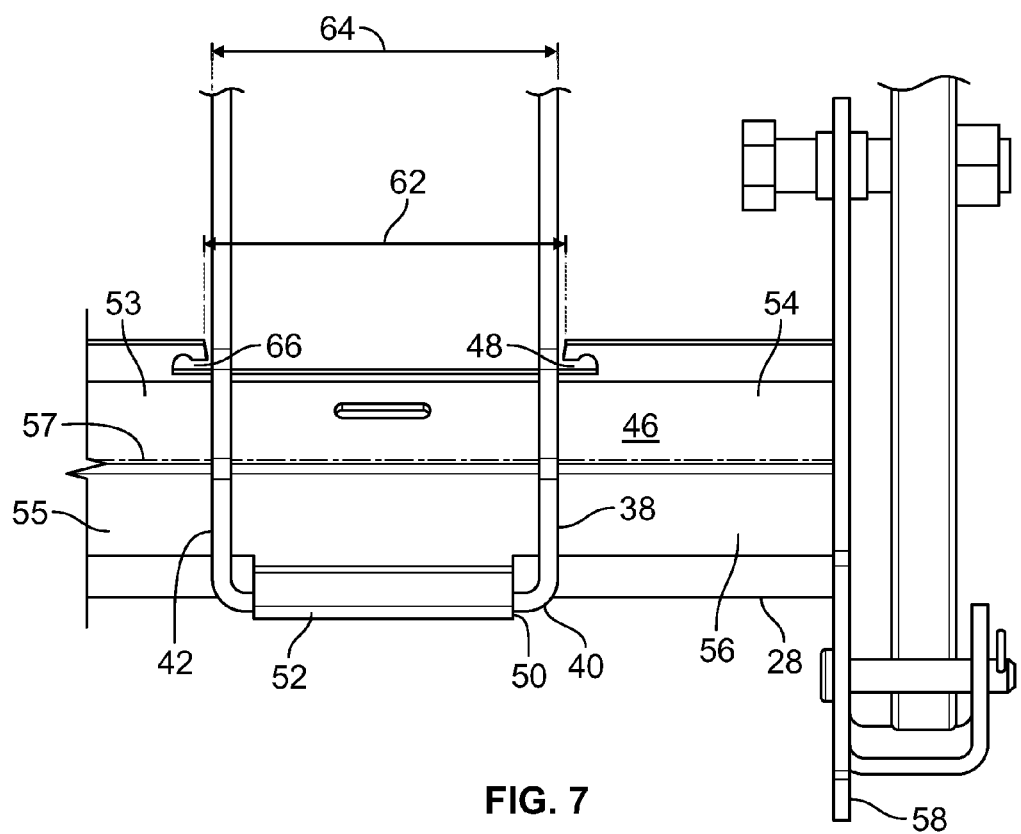
FIG. 7 is an partially enlarged, partial plan view of an alternate guide or windguard tine construction partially assembled to the frame of the crop gathering device of the present invention.
Figure 8:
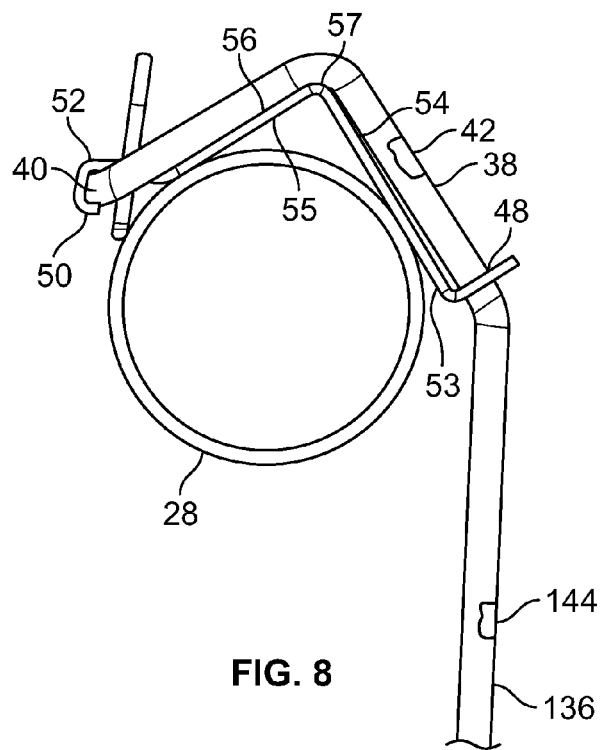
FIG. 8 is a cross section taken along line 8-8 of FIG. 6 of an alternate guide or windguard tine construction assembled to the frame of the crop gathering device of the present invention.

Referring to FIGS. 6-8, tine 130 is secured to guide member 28 in a manner similar with that associated with FIGS. 3-5. A difference between tine 130 and tine 30 is that tine 130 is configured for use with shorter crops and utilizes legs 136, 144 instead of legs 36, 44 used with tine 30.

Figure 9:
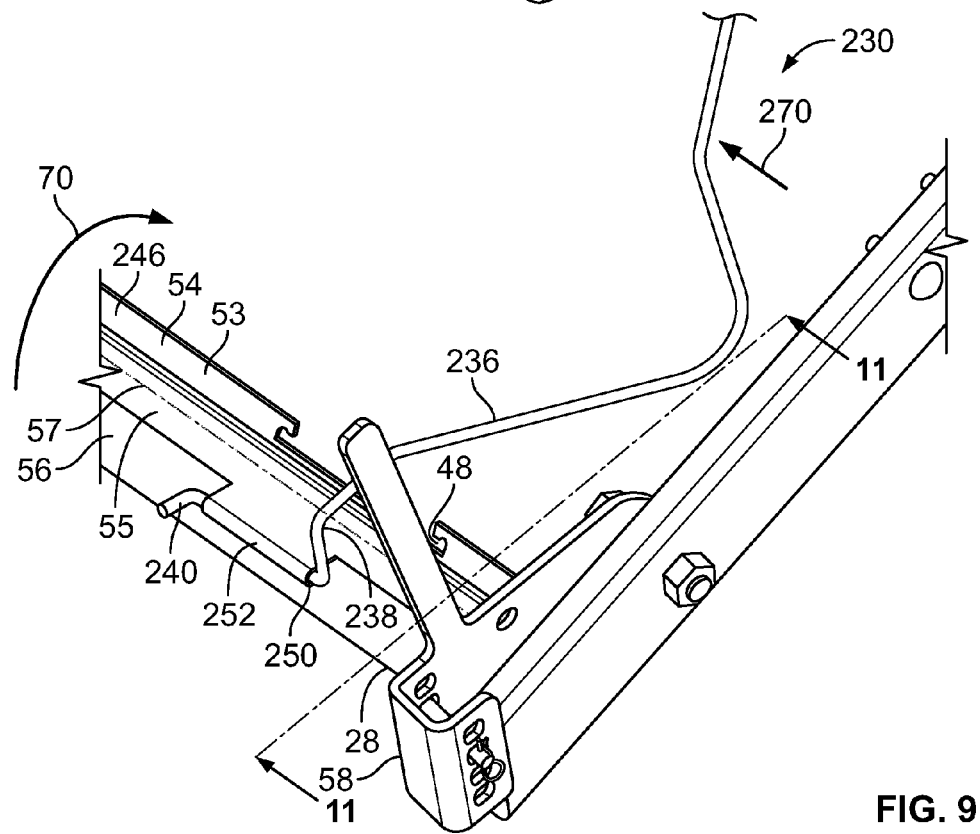
FIG. 9 is an enlarged, partial perspective view of a further alternate guide or windguard tine construction partially assembled to the frame of the crop gathering device of the present invention.
Figure 10:
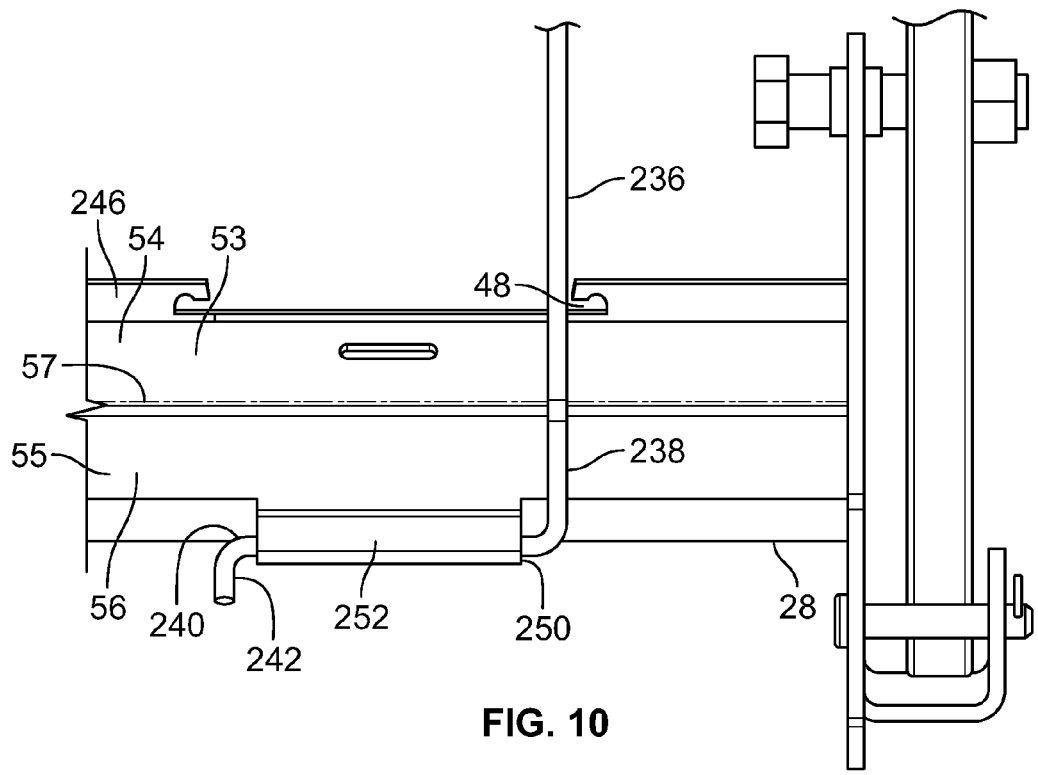
FIG. 10 is an enlarged, partial plan view of a further alternate guide or windguard tine construction partially assembled to the frame of the crop gathering device of the present invention.
Figure 11:
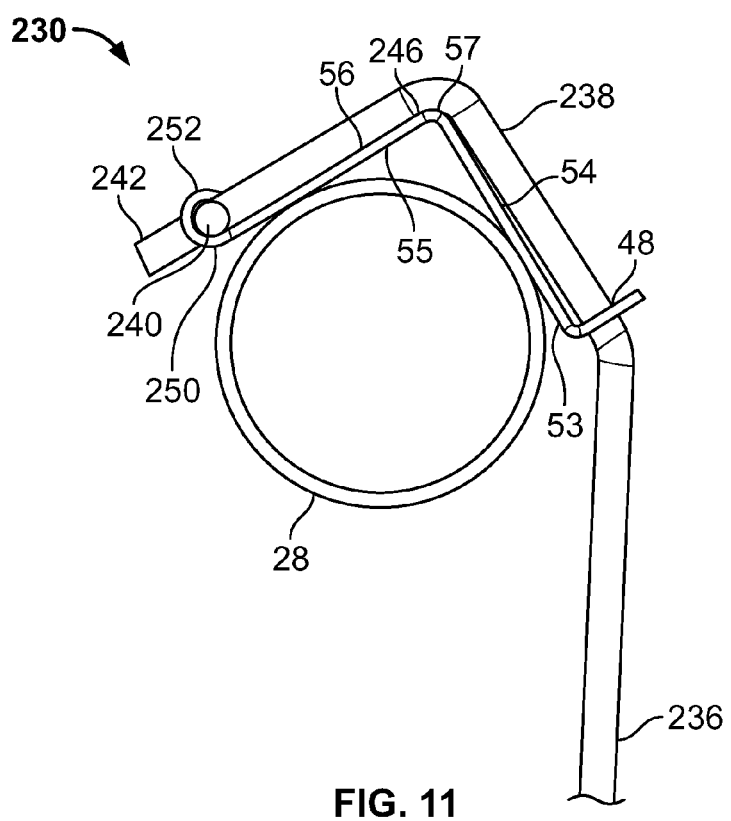
FIG. 11 is a cross section taken along line 11-11 of FIG. 9 of a further alternate guide or windguard tine construction assembled to the frame of the crop gathering device of the present invention.
Figure 12:
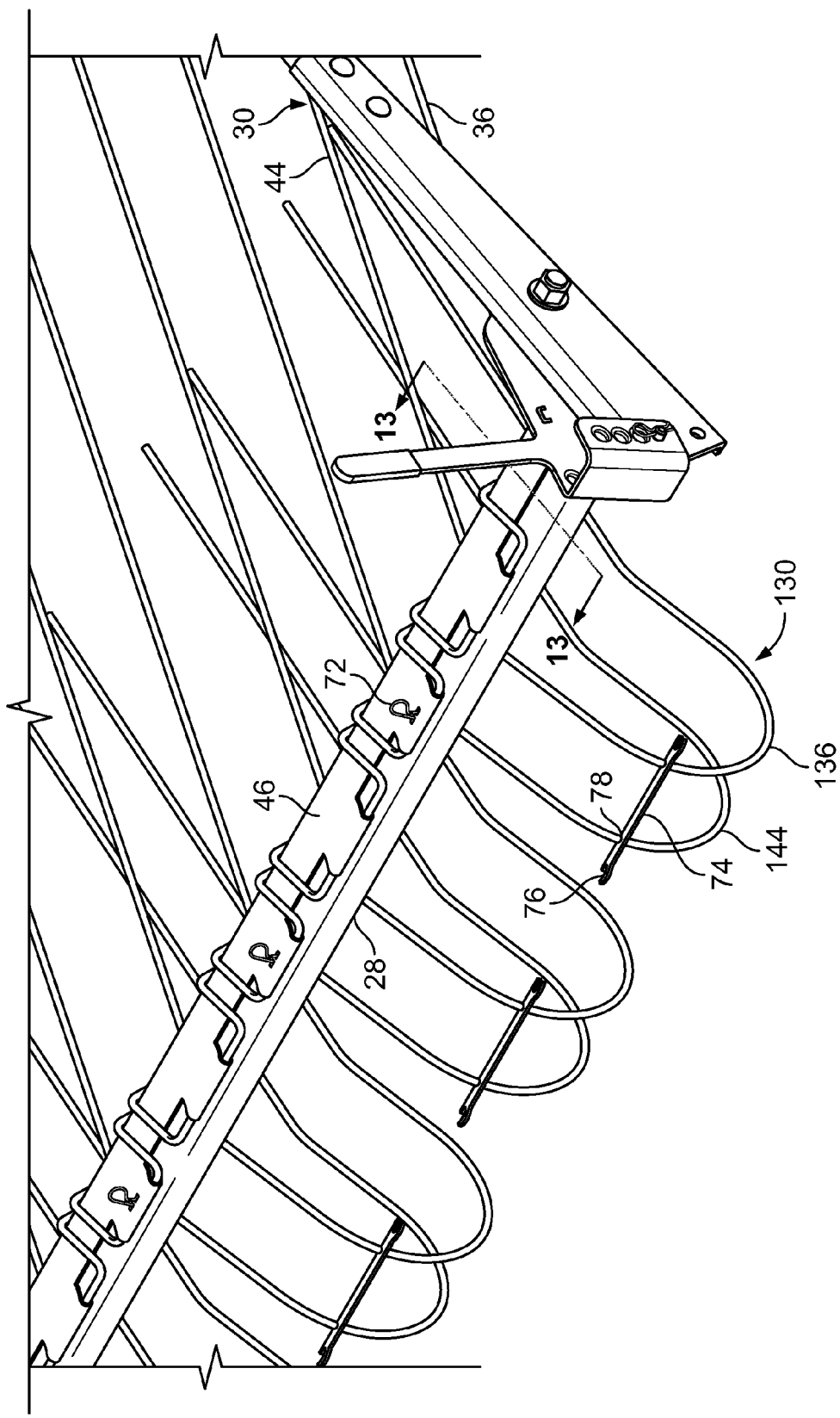
FIG. 12 is a top perspective view of an embodiment of a guide or windguard tine construction of the present invention.
Figure 13:
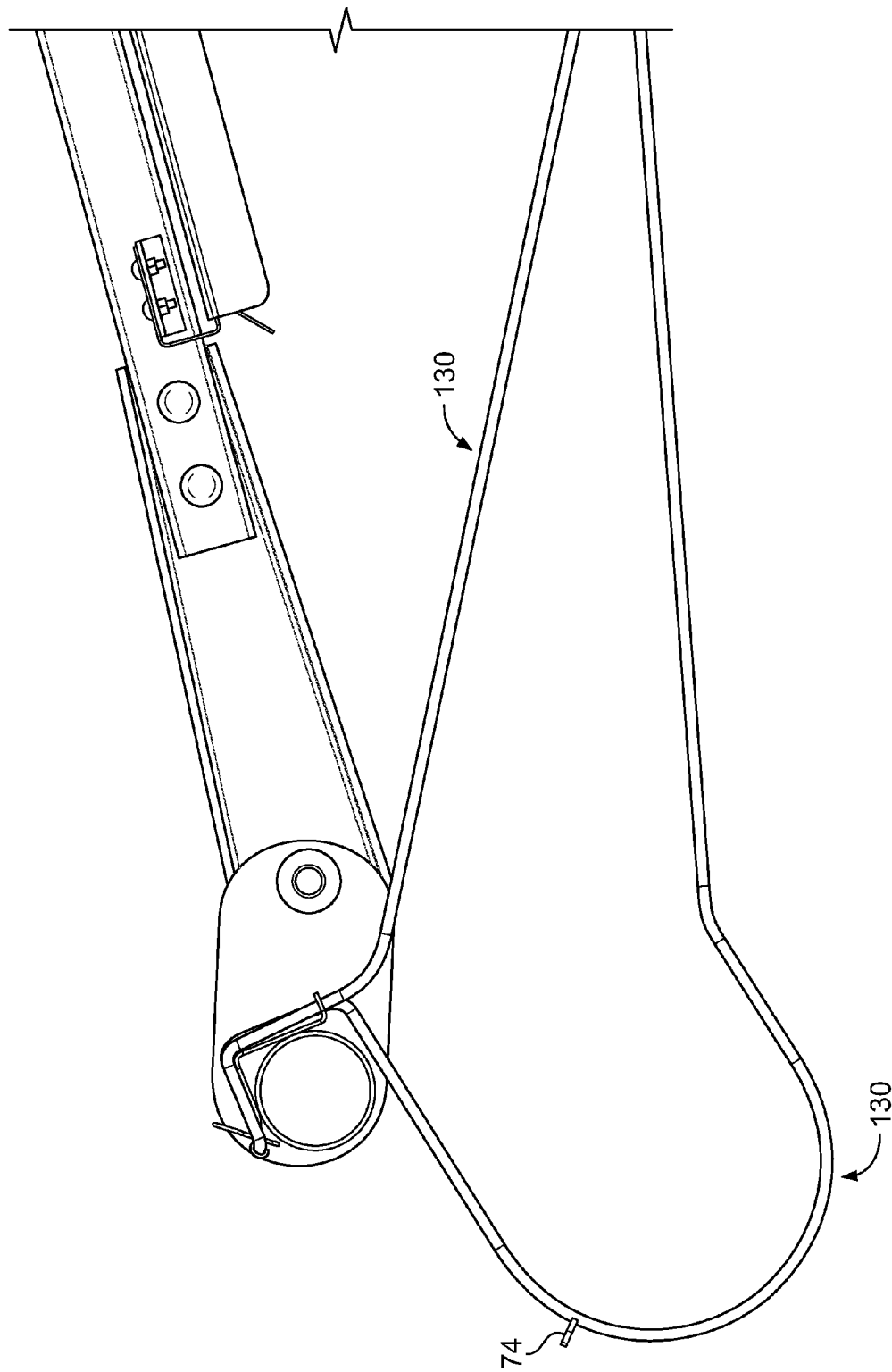
FIG. 13 is a cross section taken along line 13-13 of FIG. 12 of the guide or windguard tine construction of the present invention.

Referring to FIGS. 9-11, tine 230 is secured to guide member 28 in a manner similar with that associated with securing tine 30 in FIGS. 3-5, with the exception that only two mating engagements are required to secure tine 230 instead of the three mating engagement required to secure tine 30. Such circumstances would occur, for example with a tine embodiment containing a single leg, instead of a pair of legs. As further shown in FIGS. 9-11, tine 230 includes a first leg 236 extending to a first transition portion 238 and then further extending to a second transition portion 240. Overlay member 246 is similar to overlay member 46. Once second transition portion 240 and second mating feature 250 associated with a tab 252 formed in overlay member 246 have been brought and assembled together, tine 230 may be rotated about the axis defined by second mating feature 250 in a rotational direction 70 (FIG. 9) until the junction between first transition portion 238 and first leg 236 is brought into proximity with first mating feature 48. As further shown in FIGS. 9 and 10, first mating feature 48 defines a slot formed in an end of leg 53 of overlay member 246 opposite corner 57. Leg 236 is configured so that leg 236 may not be brought into mating engagement with its corresponding first mating feature 48. However, application of sufficient force 270 that is parallel to the axis defined by second mating feature 250 and directed away from first mating feature 48 and applied to legs 236, permits leg 236 to be brought into proximity with first mating feature 48 when accompanied by further rotation of tine 230 about the axis defined by second mating feature 250 in rotational direction 70. Also, as shown in FIG. 9, tine 230 is rotated about the axis defined by second mating feature 250 until first transition portion 238 is brought into abutting contact with surfaces 54, 56 of respective legs 53, 55 of overlay member 246. Once force 270 is no longer applied to leg 236, elastic restorative retention forces applied by tines 230 permits mating engagement with first mating feature 48.

It is to be understood that second transition portion 240 may permit rotation about the axis defined by second mating feature 250, but may further include a protrusion 242 or other feature that permits second transition portion 240 to remain in mating engagement with second mating feature 250 when leg 236 is in mating engagement with first mating feature 48.

It is to be understood that while second mating feature 50 and 250 face in opposite directions and that mating features 48, 66 are shown perpendicular to mating features 50 and 250 in the exemplary embodiments, the present invention is not so limited, and that alternative embodiments may have mating features that are neither parallel nor perpendicular to each other.

Figure 14:
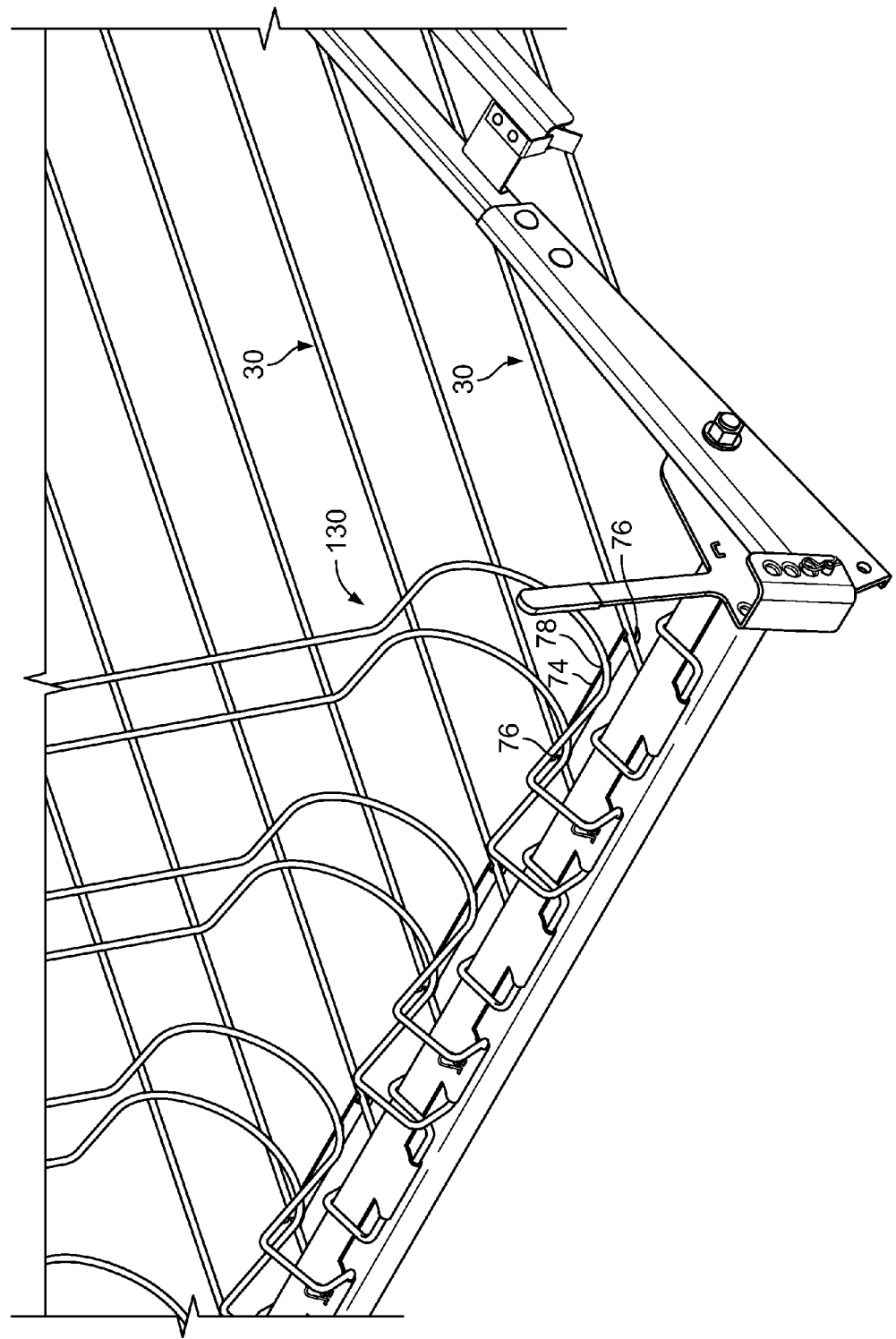
FIGS. 14 and 15 are respective top perspective and plan views of an alternate arrangement of the embodiment of the guide or windguard tine construction of the present invention.
Figure 15:
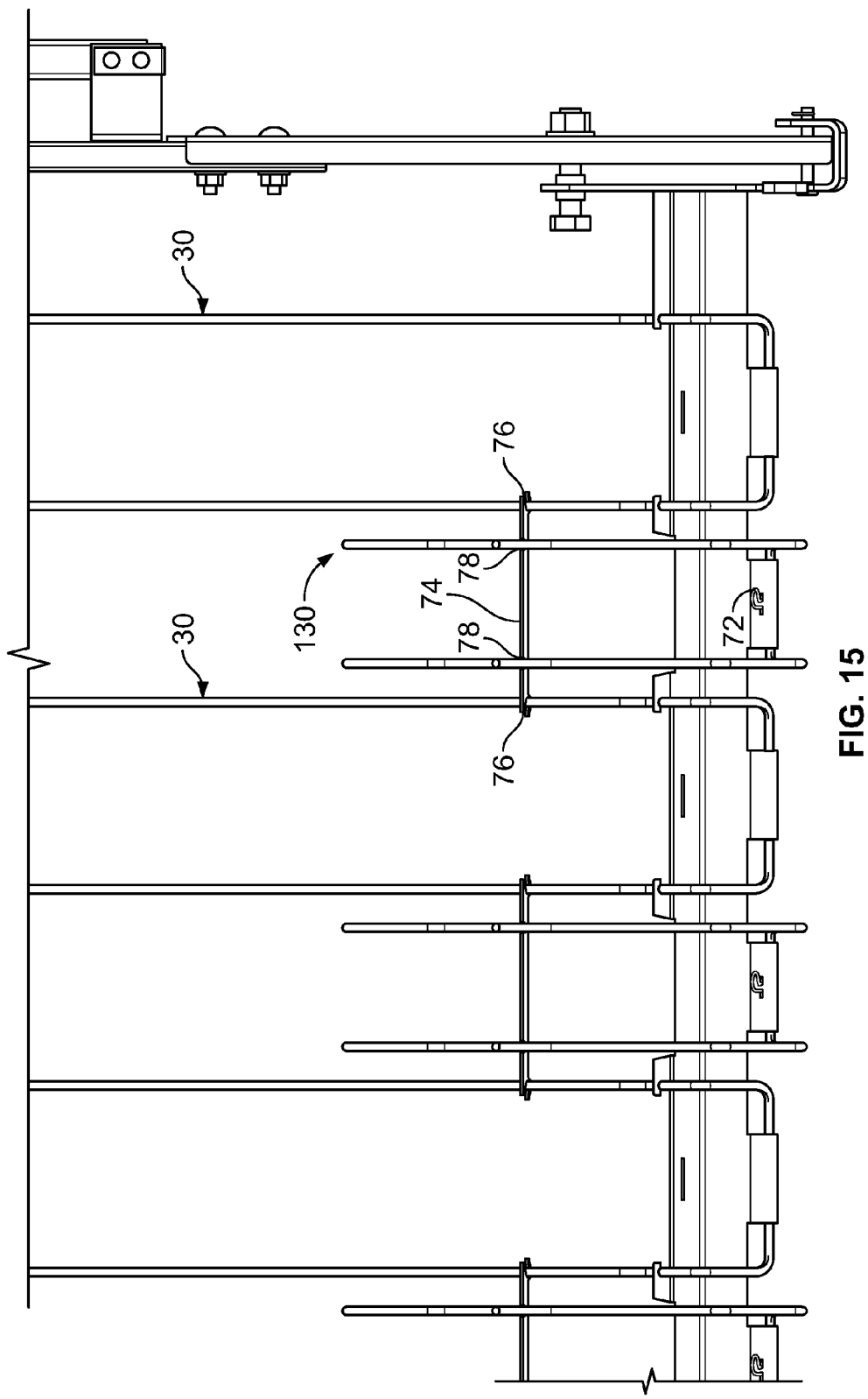

Referring to FIGS. 12-15 is an arrangement of alternating tines 30, 130 of the present invention. Fasteners 72 extending through a recess 80 formed in tab 252 of overlay member 46 secure tines 130 to overlay member 46. A spanner/support 74 utilizes notches 78 to maintain legs 136, 144 at a predetermined spacing from each other. FIGS. 14-15 further show an alternate arrangement in which legs 136, 144 of tines 130 are rotated out of the way. To maintain legs 136, 144 of tines 130 in its rotated position, notched ends of a spanner/support 74 engage corresponding legs of adjacent tines 30. Tines 130 should be rotated upward, or removed, when harvesting normal sized windrows rather than short, light crops Tines 130 could be in either position for road travel, but when raised, the tines will be less susceptible to "bouncing", resulting in reduced noise. In an alternate embodiment, overlay member 46 may include mating features to secure one or more legs of tines 130.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An agricultural harvester comprising:
a frame carrying a structure movable about an endless path to deliver a crop to a header, the frame including a guide assembly comprising:
a guide member supported by the frame; and
at least one tine is secured to the guide member without extending through the guide member, and the at least one tine extends from the guide member above the structure to guide the crop between the at least one tine and the structure to the header;
wherein the at least one tine is installable and removable from the guide member without disconnecting the guide member from the frame;
wherein the at least one tine is installable and removable from the guide member substantially without tools, further wherein the at least one tine includes a first leg extending to a first transition portion configured to be received by a first mating feature of the guide member, the at least one tine further includes a second transition portion configured to be received by a second mating feature of the guide member.

2. The harvester of claim 1, wherein the structure is a belt.

3. The harvester of claim 2, wherein the belt includes prongs extending outwardly from the belt.

4. The harvester of claim 1, wherein the first transition portion is substantially conformal with an exterior surface of the guide member.

5. The harvester of claim 1, wherein the guide member includes an overlay member having the first mating feature and the second mating feature formed therein.

6. The harvester of claim 5, wherein the first transition portion is substantially conformal with a surface of the overlay member.

7. The harvester of claim 1, wherein the at least one tine further comprises a third transition portion configured to be received by a third mating feature of the guide member.

8. The harvester of claim 7, wherein the at least one tine extends from the third transition portion to a second leg.

9. The harvester of claim 7, wherein the first mating feature and the third mating feature substantially face each other.

10. The harvester of claim 9, wherein the guide member includes an overlay member having the first mating feature, the second mating feature and the third mating feature.

11. The harvester of claim 8, wherein dividing the at least one tine along the midpoint of the second transition portion defines two substantially mirror-image components.

12. The harvester of claim 9, wherein the first mating feature and a third mating feature are slots.

13. The harvester of claim 10, wherein the second mating feature is a tab.

14. The harvester of claim 1, wherein the at least one tine is configured to help deliver crops of reduced height from the ground to the header.

15. The harvester of claim 14, wherein the at least one tine, comprises at least two different tine configurations.

16. A guide assembly for use with an agricultural harvester having a frame carrying a structure movable about an endless path to deliver a crop to a header, the guide assembly comprising:

a guide member supportable by the frame; and at least one tine securable over an exterior surface of the guide member without extending through the guide member, and configured to extend from the guide member above the structure to guide the crop between the at least one tine and the structure to the header;

wherein the at least one tine is removable from the guide member without disconnecting the guide member from the frame;

wherein the at least one tine is removable from the guide member substantially without tools, further wherein the at least one tine includes a first leg extending to a first transition portion configured to be received by a first mating feature of the guide member, the at least one tine further includes a second transition portion configured to be received by a second mating feature of the guide member.

17. The harvester of claim 16, wherein the guide member includes an overlay member having the first mating feature and the second mating feature formed therein.

* * * * *